(12) United States Patent
Urano et al.

(10) Patent No.: US 11,192,430 B2
(45) Date of Patent: Dec. 7, 2021

(54) CONTROLLING SUNSHADES IN AN AUTONOMOUS VEHICLE

(71) Applicant: TOYOTA RESEARCH INSTITUTE, INC., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 311 days.

(21) Appl. No.: 16/284,487

(22) Filed: Feb. 25, 2019

(65) Prior Publication Data

US 2020/0269663 A1 Aug. 27, 2020

(51) Int. Cl.
| | | |
|---|---|---|
| *B60R 22/00* | (2006.01) | |
| *E05F 15/00* | (2015.01) | |
| *G05D 1/00* | (2006.01) | |
| *G05D 3/00* | (2006.01) | |
| *G06F 7/00* | (2006.01) | |
| *G06F 17/00* | (2019.01) | |
| *B60J 1/20* | (2006.01) | |
| *G05D 1/02* | (2020.01) | |
| *G01C 22/00* | (2006.01) | |

(52) U.S. Cl.
CPC .......... *B60J 1/2011* (2013.01); *G05D 1/0088* (2013.01); *G05D 1/021* (2013.01); *G05D 2201/0213* (2013.01)

(58) Field of Classification Search
CPC ..... B60J 1/2011; G05D 1/0088; G05D 1/021; G05D 2201/0213

USPC .................................................. 701/49, 23
See application file for complete search history.

(56) References Cited

U.S. PATENT DOCUMENTS

| | | | |
|---|---|---|---|
| 6,227,601 B1 | 5/2001 | Lafrance | |
| 6,916,043 B2 | 7/2005 | Rhea et al. | |
| 2015/0261219 A1* | 9/2015 | Cuddihy | B60J 1/2016 701/23 |
| 2018/0093675 A1* | 4/2018 | Holub | B60W 30/14 |
| 2018/0244175 A1* | 8/2018 | Tan | B60N 2/22 |
| 2019/0092170 A1* | 3/2019 | Gassman | B60R 11/0235 |
| 2019/0152303 A1* | 5/2019 | Ghannam | B60J 3/04 |
| 2020/0062274 A1* | 2/2020 | Kowal | G07C 5/008 |

OTHER PUBLICATIONS

Kashem, Saad Bin Abul, "Autonomous Vehicle Sunshade," Int'l Journal of Mechanical and Production Engineering, Apr. 2017, pp. 39-45, vol. 5—Issue 4.
Stocksdale, Joel, "BMW Brings Its Self-Driving, Self-Parking 5 Series Prototype to CES," autoblog.com, Jan. 4, 2017.

* cited by examiner

*Primary Examiner* — Mahmoud S Ismail
(74) *Attorney, Agent, or Firm* — Seyfarth Shaw LLP (57) ABSTRACT

A method for controlling a sunshade of an autonomous vehicle is presented. The method includes determining that current conditions satisfy an activation condition. The method also includes predicting whether a driver will enable a manual mode during the current conditions. The method further includes activating a first sunshade in response to the satisfied activation condition regardless of whether the driver will enable the manual mode. The method still further includes activating a second sunshade in response to the satisfied activation condition when the driver will not enable the manual mode.

18 Claims, 6 Drawing Sheets

CONTROLLING SUNSHADES IN AN AUTONOMOUS VEHICLE

BACKGROUND

Field

Certain aspects of the present disclosure generally relate to vehicle sunshades and, more particularly, to a system and method for controlling sunshades in a vehicle.

Background

Conventional vehicles include sunshades to improve passenger comfort. In most cases, the sunshades are constrained to the rear passenger windows and/or the rear window. Because the sunshades obstruct the driver's view, sunshades are not installed on the windshield and/or the front side windows. When operating in an autonomous mode, the constraints for conventional vehicles do not apply to autonomous vehicles. As such, sunshades may be installed on the windshield and/or front side windows of an autonomous vehicle. The autonomous vehicle may include a manual mode and an autonomous. Therefore, it is desirable to control sunshades based on an operation mode of an autonomous vehicle.

SUMMARY

In one aspect of the present disclosure, a method for controlling a sunshade of an autonomous vehicle is disclosed. The method includes determining that current conditions satisfy an activation condition. The method also includes predicting whether a driver will enable a manual mode during the current conditions. The method further includes activating a first sunshade in response to the satisfied activation condition regardless of whether the driver will enable the manual mode. The method still further includes activating a second sunshade in response to the satisfied activation condition when the driver will not enable the manual mode.

In another aspect of the present disclosure, a non-transitory computer-readable medium with non-transitory program code recorded thereon is disclosed. The program code is for controlling a sunshade of an autonomous vehicle. The program code is executed by a processor and includes program code to determine that current conditions satisfy an activation condition. The program code also includes program code to predict whether a driver will enable a manual mode during the current conditions. The program code further includes program code to activate a first sunshade in response to the satisfied activation condition regardless of whether the driver will enable the manual mode. The program code still further includes program code to activate a second sunshade in response to the satisfied activation condition when the driver will not enable the manual mode.

Another aspect of the present disclosure is directed to an apparatus for controlling a sunshade of an autonomous vehicle. The apparatus having a memory and one or more processors coupled to the memory. The processor(s) is configured to determine that current conditions satisfy an activation condition. The processor(s) is also configured to predict whether a driver will enable a manual mode during the current conditions. The processor(s) is further configured to activate a first sunshade in response to the satisfied activation condition regardless of whether the driver will enable the manual mode. The processor(s) still further configured to activate a second sunshade in response to the satisfied activation condition when the driver will not enable the manual mode.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Conventional vehicles include sunshades for improving passenger comfort. For example, the sunshades may block sunlight and reduce cabin temperature. Sunshades, however, may obstruct the driver's view during manual operation. Therefore, in conventional vehicles, the sunshades are constrained to the rear passenger windows and/or the rear window.

An autonomous vehicle may be autonomously operated based on data captured from multiple sensors, such as radio detection and ranging (RADAR), light detection and ranging (LIDAR), red-green-blue (RGB) cameras, and other types of sensors. For improved visibility, the sensors may be defined on exterior portions of the vehicle, such as the roof, front bumper, rear bumper, side mirrors, front grill, etc. As such, during autonomous operation, sunshades do not affect the autonomous vehicle's ability to navigate through an environment.

For improved passenger comfort, sunshades may cover the windows during autonomous operation. In some cases, during autonomous operation, a sunshade controller may activate the sunshades in response to weather (e.g., heat) and/or lighting conditions. During autonomous operation, the passenger may manually control the sunshades. For example, the passenger may activate the sunshades for privacy.

Autonomous vehicles may operate in an autonomous mode or a manual mode. In the manual mode, a human driver manually operates the vehicle. As discussed, it is unsafe to manually operate the vehicle when the windshield sunshade, front driver side window sunshade, and/or front passenger side window sunshade are activated. There is a desire to improve autonomous vehicles by providing a system to anticipate manual operation and deactivate one or more sunshades before manual operation.

Aspects of the present disclosure are directed to controlling sunshades of an autonomous vehicle based on a predicted driving mode and current conditions. As a result, the cabin conditions are improved during autonomous operation. The autonomous vehicle may be a mobility-as-a-service (MAAS) vehicle (e.g., rideshare vehicle) or a personally owned vehicle. The autonomous vehicle includes a manual mode for manual operation by a human driver. The autonomous vehicle may be referred to as a vehicle.

Figure 1A:
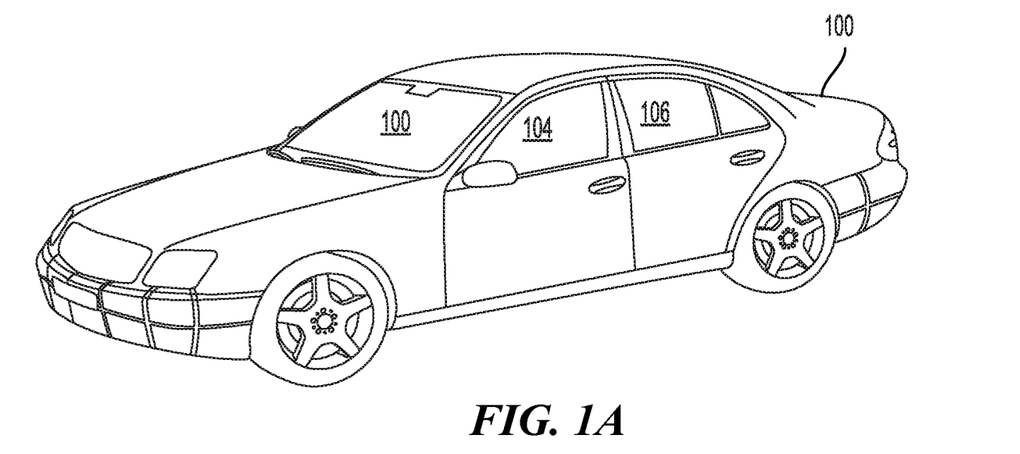
FIGS. 1A and 1B illustrate examples of a vehicle according to aspects of the present disclosure.

FIG. 1A illustrates an example of a vehicle 100 according to aspects of the present disclosure. In the example of FIG. 1A, the vehicle's 100 sunshades are deactivated. The deactivated sunshades do not obstruct an occupant's view. That is, the occupant may view an exterior environment through the front windshield 102, front driver side window 104, front passenger side window (not shown), rear passenger window 106, and/or rear windshield (not shown). Aspects of the present disclosure are not limited to a specific number of windows and windshields on the vehicle 100. The vehicle 100 also includes another rear passenger window (not shown).

Figure 1B:
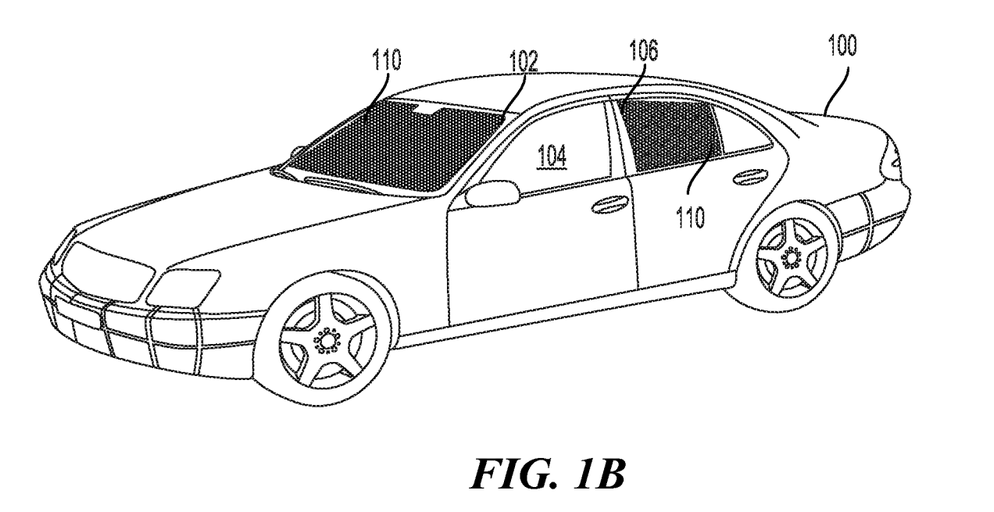

FIG. 1B illustrates another example of the vehicle 100 according to aspects of the present disclosure. As shown in FIG. 1B, the sunshades 110 of the vehicle 100 are activated on the front windshield 102 and the rear passenger window 106. The activated sunshades obstruct an occupant's view and limit an amount of light from entering the cabin through the window 102, 106. That is, the activated ones of the sunshades 110 may obstruct a view of the exterior environment through a corresponding window 102, 106. The activated ones of the sunshades 110 may cover all of a window 102, 106 (as shown in FIG. 1B) or a portion of the window 102, 106. Aspects of the present disclosure are not limited to incorporating the sunshades 110 on the front windshield 102 and the rear passenger window 106. The sunshades may be incorporated on all windows 102, 104, 106 or a subset of the windows.

In one configuration, the sunshades are a textile material that expands and retracts to cover at least a portion of a window and/or windshield. Additionally, or alternatively, the windows and/or windshields may be electronically tintable. The electronically tintable windows and/or windshields may be dynamically tinted with varying levels of tint. For example, an electronically tintable glass may be used to implement a window or windshield of an autonomous vehicle. In operation, when the electrical supply is switched on, a chemical compound, such as liquid crystal molecules, aligns to allow light to pass through the electronically tintable glass. Furthermore, when the power is switched off, the chemical compound is randomly oriented to scatter light. The electronically tintable glass is tinted (e.g., opaque) due to the scattered light.

According to aspects of the present disclosure, some sunshades of the vehicle are defined as limited sunshades while other sunshades are defined as anytime sunshades. Limited sunshades refer to sunshades that cannot be activated during manual operation. For example, a sunshade on a front windshield is a limited sunshade. Anytime sunshades refer to sunshades that can be activated during manual operation. For example, a sunshade on a rear passenger window is an anytime sunshade.

Different interfaces may control the sunshades. For example, the sunshades may be activated/deactivate via buttons, switches, a touchscreen, voice control, a user device (e.g., smartphone), and/or another type of interface. Each sunshade may be controlled via different activation switches, different sets of sunshades (e.g., limited or anytime) may be controlled via different activation switches, and/or all sunshades may be controlled via one activation switch. During manual or autonomous operation, the interface is used to activate one or more sunshades.

In one configuration, before activating the sunshades, a sunshade control system determines an operation mode of the vehicle (e.g., autonomous or manual). In this configuration, during manual operation, if the driver activated a limited sunshade, the sunshade control system prevents the activation. The sunshade control system may also provide a notification to inform the driver that limited sunshades cannot be activated during manual operation.

In some cases, the limited sunshades may be activated during manual operation. In one configuration, during manual operation, the limited sunshades can be activated when a vehicle's transmission is in park mode and/or when the vehicle's speed (e.g., velocity) is zero. When the limited sunshades are activated, the sunshade control system prevents movement of the vehicle and/or prevents changing the transmission from park to drive. In response to detecting the driver's desire to move the vehicle, the sunshade control system may deactivate at least the limited sunshades or provide a notification for the driver to deactivate at least the limited sunshades.

Various conditions may be considered for controlling the limited and anytime sunshades. The conditions may include, but are not limited to, the vehicle's occupancy status, autonomous operation of the vehicle, automated driving being in progress, manual operation of the vehicle, expected manual operation of the vehicle, a change in vehicle occupancy, cabin conditions (e.g., cabin temperature), environmental conditions (e.g., exterior temperature, weather conditions, and/or light levels), and/or a direction of the vehicle relative to the sun. The sunshade control system controls the limited and anytime sunshades based on one or more of the conditions discussed above.

For example, the sunshade control system may activate the limited and/or anytime sunshades. In one example, during manual operation, the sunshade control system activates the limited and anytime sunshades when the vehicle is facing the sun and the light level is above a threshold. Additionally, for certain conditions, the limited sunshades are deactivated. As one example, if the limited sunshades are activated based on the autonomous operation, the limited sunshades are deactivated in anticipation of manual operation.

Figure 2A:
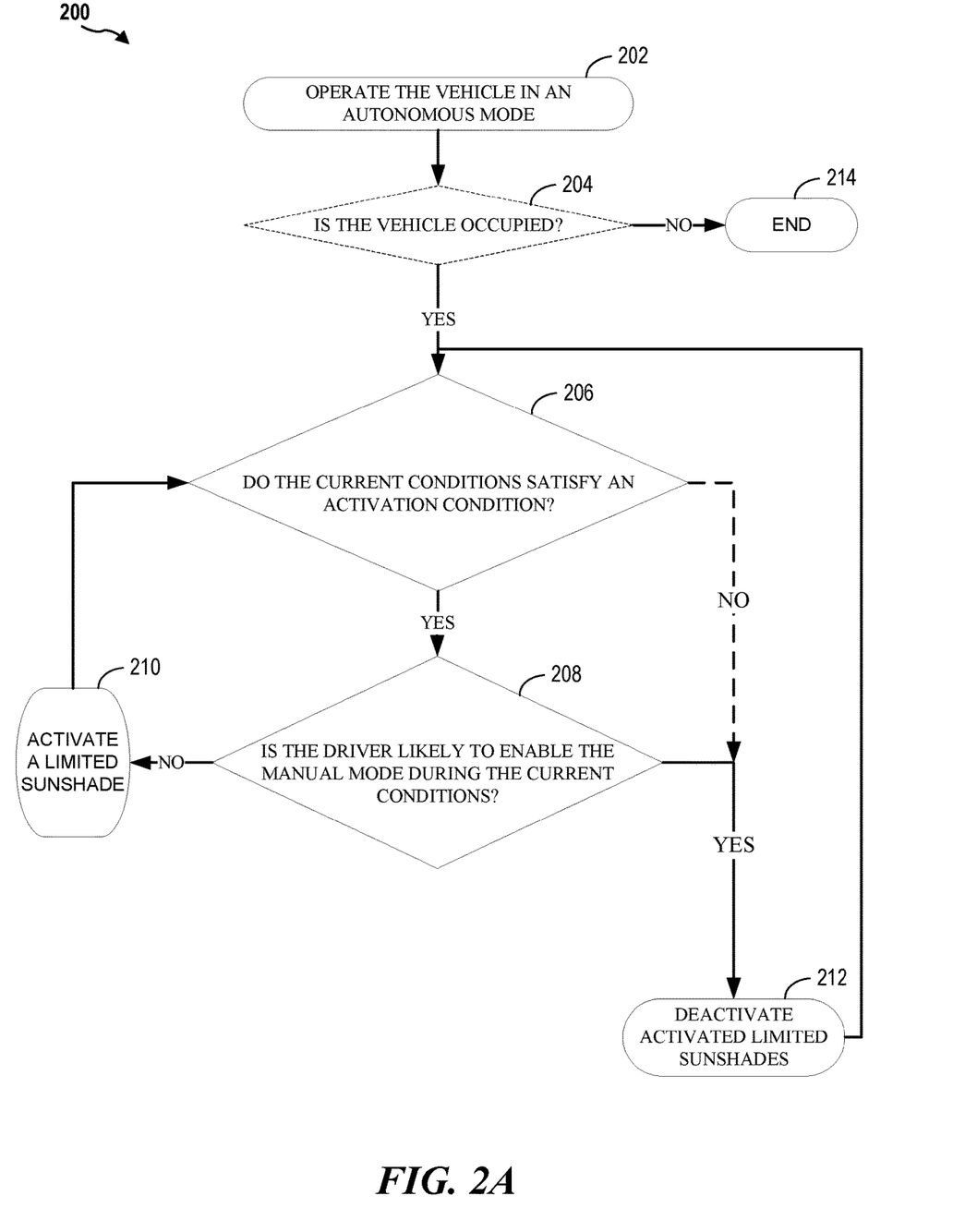
FIGS. 2A and 2B illustrate examples of flow diagrams for controlling sunshades according to aspects of the present disclosure.

FIG. 2A illustrates a flow diagram 200 for controlling limited sunshades according to aspects of the present disclosure. As shown in FIG. 2A, at block 202, the vehicle is operated in an autonomous mode. In FIG. 2A, while operating the vehicle in an autonomous mode, all limited sunshades may have been previously deactivated or one or more limited sunshades may have been previously activated. In an optional configuration, at block 204, a sunshade control system determines if the vehicle is occupied. The vehicle's occupancy may be determined from one or more sensors, such as an internal vision sensor (e.g., RGB camera) for capturing an occupant's image, a seat pressure sensor for sensing an occupant on a seat, a door sensor for sensing the opening and closing of a door, or other sensors. If the vehicle is not occupied, the operation ends (block 214).

In another configuration, the operation continues when the vehicle is unoccupied. For example, the vehicle may be traveling to pick up a passenger. To improve passenger comfort levels, the vehicle may activate the limited sunshades before arrival at a passenger pickup location.

If the vehicle is occupied, the sunshade control system determines if the current conditions satisfy an activation condition (block 206). The activation condition is a condition for activating a sunshade. Activation conditions include, but at not limited to, compartment temperature exceeding a threshold, exterior temperature exceeding a threshold, exterior and/or compartment illuminance exceeding a threshold, the front windshield facing toward the sun (e.g., traveling East during sunrise or the West during sunset), environmental conditions, and/or other conditions that may be improved by activating the limited sunshades.

The weather conditions may include an amount of moisture in the air (e.g., raining or snowing) or sunny weather. For example, if the moisture in the air is less than a threshold, the sunshades may be activated because the weather is most likely sunny. One or more sensors may be used to detect the current conditions. In one example, a vision sensor may identify rain or sunlight levels. As another example, a thermometer sensor may detect the interior and/or exterior temperature. The sunshade control system may also determine environmental conditions, such as rain or snow, based on weather reports, humidity, temperature, etc. The current conditions may also be obtained from an external source, such as the Internet.

In an optional configuration, if current conditions do not satisfy conditions for activating a limited sunshade operation (e.g., a level of sunlight in the compartment is less than a threshold), the sunshade control system deactivates any activated limited sunshades (block 212). In this optional configuration (not shown in FIG. 2A), after deactivating any activated limited sunshade, the sunshade control system may continue to monitor the current conditions (block 206). The monitoring may be continuous or at an interval. If the current conditions satisfy a condition for activating the limited sunshades, the sunshade control system may determine if the vehicle is manually operated or has a potential for manual operation. If the vehicle is neither manually operated nor has a potential for manual operation, the limited sunshades may be activated.

If the current conditions satisfy conditions for activating a limited sunshade operation (e.g., a level of sunlight in the compartment exceeding a threshold), the sunshade control system predicts whether the driver is likely to enable the manual mode during the current conditions (block 208). Based on weather data and sensor data, the sunshade control system determines a duration for the current conditions. The sunshade control system predicts a likelihood of the driver enabling the manual mode based on the passenger's known driving habits, a reservation type, a distance to a destination, resources (e.g., battery level), environmental factors, road hazards, unmapped areas, out-of-date maps, sensor failure conditions, etc. That is, the prediction may be based on areas where the vehicle may stall during the autonomous operation. The prediction is also based on the passenger's driving habits.

In one example, a personal vehicle may be driven by multiple drivers. A first driver may prefer autonomous operation and a second driver may prefer manual operation. In this example, the sunshade control system identifies the current driver to determine the likelihood of the driver enabling manual operation. Specifically, if the second driver is currently driving, the sunshade control system determines there is an increased likelihood of manual operation. As another example, for an MAAS vehicle, a passenger may reserve the vehicle for manual operation or autonomous operation. The type of reservation may be used to determine whether the passenger will enable manual operation. In the noted examples, the vehicle may be in an autonomous mode. Still, the driver may have indicated a preference for manual operation. Thus, the prediction may be based on the indicated preference.

As discussed, the prediction may be based on areas where the vehicle may stall during the autonomous operation. The stall factors may include low resources (e.g., battery), wireless signal strength being less than a threshold, environmental conditions, road hazards, unmapped areas, out-of-date maps, accidents, sensor failure conditions, etc. In one example, if the battery level is less than a threshold, the vehicle may switch to a gas engine backup. In this example, to conserve battery power, the autonomous operation may switch to the manual operation.

As another example, the vehicle may stall in areas with potential sensor failure conditions. For example, vehicle sensors (e.g., cameras) used to detect traffic light colors may fail to detect a color if an angle of the sun is within a certain range. As another example, LIDAR sensors may not function in rain or fog. In yet another example, the vehicle may lose track of its position if the route includes areas with limited signals or no signals, such as a tunnel. The signals may include different communication signals, such as a global positioning system (GPS) signal, a wireless Internet signal, a cellular signal, etc.

The stall factors may also include environmental conditions. For the sensors, such as a camera, the sunshade control system may determine backlight conditions, vehicle direction, traffic light locations, intersection arrival times, an angle of the sun, weather, building information (e.g., whether buildings block the sun), etc. The aforementioned information, such as the sun's angle, may be included in the vehicle's stored map data. The information may also be obtained from the Internet or other data sources.

For a LIDAR sensor, and other sensors, weather conditions, such as humidity, may cause sensor failure. Thus, the sunshade control system may estimate various weather conditions, such as humidity, based on available weather information. The sunshade control system may also consider the time of day and/or the travel duration. For a GPS sensor, and other sensors, a weak signal or an interrupted signal may cause sensor failure. Thus, the sunshade control system may estimate signal strength for a route. The signal strength may be estimated based on, for example, building information (e.g., height and location), tunnel locations, terrain information (e.g., a height of surrounding mountains), a number of satellites, satellite positions, a number of cell towers, a number of WiFi transceivers, etc. The information may be stored in the map data.

In one configuration, the sunshade control system determines if a stall factor is greater than or less than a threshold. For example, if the amount of rain is greater than a rain threshold, the rain is determined to be a stall factor. If the rain is less than a threshold, the rain is not considered a stall factor. In another example, if buildings and/or surrounding environmental features cause a cellular signal to be less than a threshold, the buildings and/or surrounding environmental features are stall factors. If the cellular signal is greater than a threshold in view of the buildings and/or surrounding environmental features, the aforementioned elements are not risk factors. In one configuration, a customer cannot override or ignore considerations of whether a particular route may include a stall factor.

Additionally, the distance to the destination may be used to predict a likelihood of the driver enabling the manual mode. In some locations, such as, for example, a residential area or an office parking lot, the driver may prefer to operate the vehicle manually. That is, it may be easier to navigate through a parking lot to find a preferred spot while operating the vehicle in a manual mode in comparison to an autonomous mode. Thus, if the distance to the destination is less than a threshold, the sunshade control system may predict that it is likely for the driver to enable the manual mode.

The factors discussed above may be considered as a whole to determine a value for the likelihood of manual operation. Different factors may receive different weights. For example, the driver's known preference may be weighed greater than a low cellular signal. The determined value may be compared to a threshold. If the value is greater than the threshold, the sunshade control system determines that manual operation is likely. If the value is less than the threshold, the sunshade control system determines that the manual operation is not likely.

In one configuration, the sunshade control system may limit the prediction to a certain time period (e.g., five minutes) from the current time. Limiting the prediction to a time period may improve an accuracy of the prediction. That is, as the time period extends, there is an increased likelihood for unforeseen factors to cause the driver to enable manual operation. Limiting the likelihood of unforeseen factors increases the accuracy of the predictions.

As shown in FIG. 2A, if manual operation is likely, the sunshade control system deactivates any activated limited sunshade (block 212). In one configuration (not shown in FIG. 2A), after deactivating activated limited sunshades (block 212), the sunshade control system may continue to monitor the current conditions (block 206). The monitoring may be continuous or at an interval. If the current conditions satisfy a condition for activating the limited sunshades, the sunshade control system may determine if the vehicle is manually operated or has a potential for manual operation. If the vehicle is neither manually operated nor has a potential for manual operation, the limited sunshades may be activated.

Additionally, if manual operation is not likely, the sunshade control system activates the limited sunshades to mitigate the current conditions (block 210). The sunshade control system may selectively activate the limited sunshades. For example, if the vehicle is facing the sun, only the front windshield sunshade may be activated. Alternatively, all limited sunshades may be activated when a condition is satisfied. The limited sunshades may be activated until the current conditions are resolved. The sunshade control system may continue to monitor the current conditions (block 206) while the limited sunshades are activated.

Aspects of the present disclosure are not limited to detecting the current conditions (block 206) prior to determining if manual operation is likely (block 208). In one configuration, determining the likelihood of manual operation (block 208) is performed after detecting the current conditions (block 206).

Figure 2B:
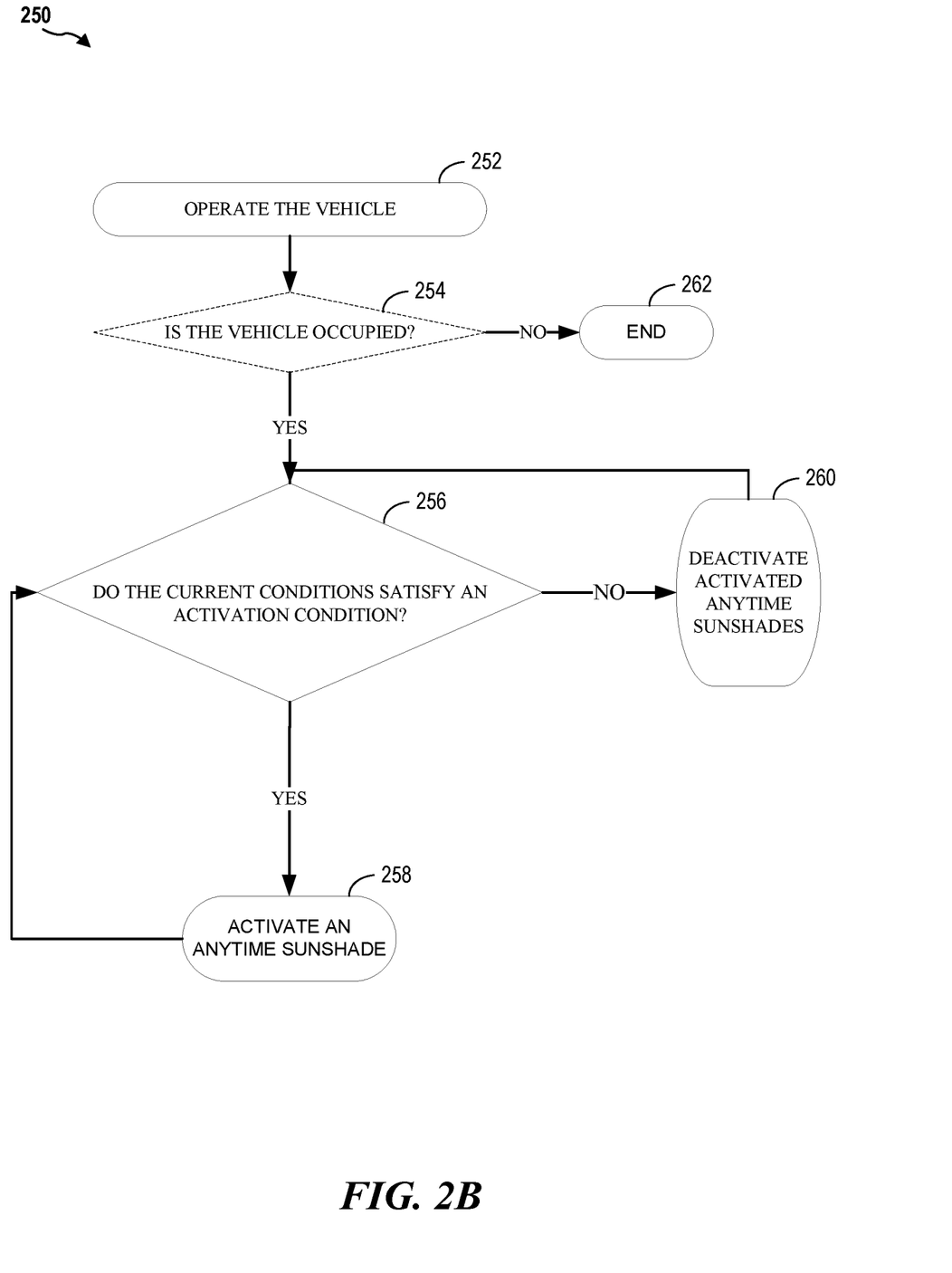

FIG. 2B illustrates a flow diagram 250 for controlling anytime sunshades according to aspects of the present disclosure. As shown in FIG. 2B, at block 254, the vehicle is operating (e.g., driving). The vehicle may be operated in a manual mode or an autonomous mode. In FIG. 2B, during a previous operation, all anytime sunshades may have been previously deactivated or one or more anytime sunshades may have been previously activated. In an optional configuration, at block 254, a sunshade control system determines if the vehicle is occupied. The vehicle's occupancy may be determined from one or more sensors, such as an internal vision sensor (e.g., RGB camera) for capturing an occupant's image, a seat pressure sensor for sensing an occupant on a seat, a door sensor for sensing the opening and closing of a door, or other sensors. If the vehicle is not occupied, the operation ends (block 262).

If the vehicle is occupied, the sunshade control system determines if the current conditions satisfy activation conditions (block 256). Conditions that satisfy activating the sunshades include compartment temperature exceeding a threshold, exterior temperature exceeding a threshold, exterior and/or compartment illuminance exceeding a threshold, the front windshield facing toward the sun (e.g., traveling East during sunrise or the West during sunset), environmental conditions, and/or other conditions that may be improved by activating the anytime sunshades.

In an optional configuration, if current conditions do not satisfy conditions for activating an anytime sunshade operation (e.g., a level of sunlight in the compartment is less than a threshold), the sunshade control system deactivates previously activated anytime sunshades (block 260). In this optional configuration (not shown in FIG. 2A), after deactivating activated anytime sunshades (block 260), the sunshade control system may continue to monitor the current conditions (block 256). The monitoring may be continuous or at an interval.

If the current conditions satisfy a condition for activating the anytime sunshades, the sunshade control system activates the anytime sunshades (block 258). The sunshade control system may selectively activate the anytime sunshades. For example, if the light is entering a passenger side of the vehicle, only the passenger side anytime sunshade may be activated. The passenger side refers to a side that is opposite a driver side of a conventional manually operated vehicle. Alternatively, all anytime sunshades may be activated when a condition is satisfied. The anytime sunshades may be activated until the current conditions are resolved. The sunshade control system may continue to monitor the current conditions (block 256) while the limited sunshades are activated.

In one configuration, the limited and/or anytime sunshades are configured to activate when an activation condition is satisfied (see FIGS. 2A and 2B). An interface, such as a human-machine interface (HMI) may be used to activate autonomous control of the sunshades. User input may enable or disable the autonomous activation of the sunshades in response to an activation condition being satisfied. If the autonomous activation of the sunshades is disabled, the sunshades may be limited to manual activation (e.g., activation by an occupant of the vehicle).

In certain cases, a subset of the sunshades is manually activated. After the manual activation, the user may enable the autonomous activation of the sunshades. In this example, the deactivated sunshades may be activated when an activation condition is satisfied. As another example, the manually activated sunshades may be autonomously deactivated as necessary. In one example, the limited sunshades that were previously manually activated may be autonomously deactivated if manual operation is likely.

Figure 3:
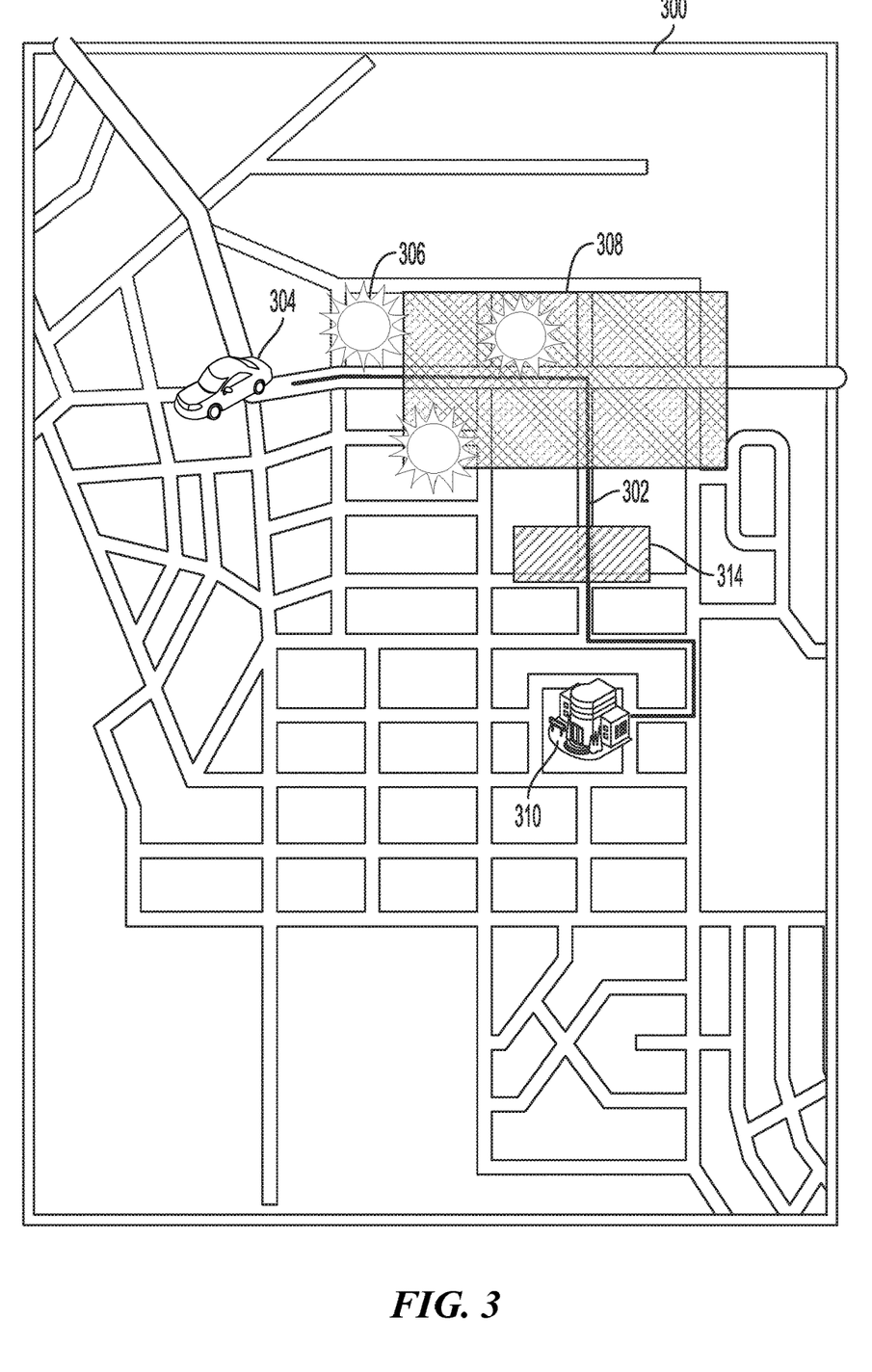
FIG. 3 illustrates an example of controlling sunshades based on a predicted manual operation according to aspects of the present disclosure.

FIG. 3 illustrates an example of controlling sunshades based on activation conditions and/or a predicted manual operation according to aspects of the present disclosure. As shown in FIG. 3, a vehicle 304 may start a route 302 in an area 300. A sunshade control system may be aware of an entirety of the route 302 or a portion of the route 302. In this example, a portion of the area 300 includes sunny conditions 306. In this example, due to one or more conditions, such as an angle of the vehicle 304 in relation to the sun and/or a location of the sun, an amount of sunlight entering the cabin may be above a threshold.

Furthermore, the area 300 includes an outdated map section 308. The outdated map section 308 refers to a portion of the area 300 where a time since a last map update is greater than a threshold. The outdated map section 308 may also refer to an area without map information, such as an area with private roads. The vehicle 304 may have difficulties navigating through the outdated map section 308 in an autonomous mode. In one configuration, prior to entering the outdated map section 308, the vehicle 304 warns the driver of the potential stall, such that the driver may enable the manual mode. In another configuration, prior to entering the outdated map section 308, the vehicle 304 warns the driver that the manual mode will be enabled within a certain time period.

In this example, the vehicle 304 may be an MAAS vehicle that receives a reservation from a customer requesting to be dropped off at an office 310. Alternatively, the vehicle 304 may be a personal vehicle and the driver has entered the office 310 as the destination. In both cases, the vehicle 304 is intended to navigate the route 302 autonomously. Upon receiving the destination, the vehicle 304 (e.g., the vehicle's 304 navigation system) determines the route 302 to the office 310.

In one configuration, prior to navigating the route 302, the sunshade control system determines that there sunny conditions 306 on a portion of the route 302. As such, due to the sunny conditions 306 (e.g., stall factor), there is a potential for stalling on the route 302. The sunny conditions 306 may cause sensor failure (e.g., LIDAR failure) due to the angle of the sun. The sunshade control system may also determine if the amount of sunshine is greater than a threshold. In the present example, the amount of sunshine is less than a sensor failure threshold, therefore, the stall factor is negligible. As such, the sunny conditions 306 do not increase a likelihood for manual operation.

Still, because the sunny conditions 306 may cause the amount of sunlight entering the cabin to be above a threshold, the sunshade control system determines that a sunshade activation factor may be satisfied. Therefore, prior to entering the area with sunny conditions 306, the sunshade control system may activate anytime sunshades and/or limited sunshades. Furthermore, the sunshade control system determines if various factors may increase or cause a likelihood of manual operation (e.g., enabling a manual mode) during the portion of the route 302 with sunny conditions 306. In this example, the area of sunny conditions 306 overlaps with the outdated map section 308. As such, the likelihood of manual operation is greater than a threshold because the vehicle 304 may have difficulties navigating the outdated map section 308 in an autonomous mode. Therefore, prior to entering the outdated map section 308, the sunshade control system deactivates any activated limited sunshades.

In another configuration, the sunshade control system determines current conditions after the vehicle 304 begins operating in the autonomous mode. In this configuration, when the vehicle 304 starts navigating the route 302, the sunshade control system monitors the current conditions at an interval. In this example, the sunshade control system detects the sunny conditions 306 at the start of the route 302.

Upon detecting the sunny conditions 306, the sunshade control system may determine a duration of the sunny conditions 306. The sunshade control system may also predict if a driver will enable the manual mode during a portion of the route 302 with the sunny conditions 306. As discussed, the area of sunny conditions 306 overlaps with the outdated map section 308. As such, the sunshade control system predicts the driver will enable the manual mode at, or prior to, entering the outdated map section 308. Therefore, prior to entering the outdated map section 308, the sunshade control system deactivates any activated limited sunshades.

In one configuration, the sunshade control system deactivates any activated sunshade (e.g., limited or anytime) after the activation condition has ended or after the activation condition has been resolved. For example, the sunshades may be deactivated when the cabin temperature falls below a threshold. As another example, the sunshades may be deactivated when the sunny conditions 306 end (e.g., a cloud covers the sun) or when the vehicle 304 leaves the area with the sunny conditions 306.

In another configuration, if the condition persists, the sunshade control system activates one or more limited sunshades when the vehicle 304 enters the autonomous mode. For example, upon entering the outdated map section 308, the driver or the sunshade control system may determine that the map is up-to-date and enable the autonomous mode. In this example, the vehicle 304 may still be in an area with sunny conditions 306. Therefore, limited sunshades may be activated when the vehicle 304 enters the autonomous mode.

In yet another configuration, after navigating through the outdated map section 308, the vehicle 304 may re-enable the autonomous mode. The autonomous mode may be re-enabled based on user input. Alternatively, the autonomous mode may be re-enabled when the vehicle 304 determines that it is no longer in an area with a stall factor. While the vehicle 304 is in the autonomous mode, the driver may enable the manual mode via user input. The manual mode may be enabled based on the driver's desire to manually operate the vehicle 304.

In response to the user input to enable the manual mode, the sunshade control system determines the current conditions. In the example of FIG. 3, the route 302 includes a high temperature area 314. That is, the cabin temperature may not be above a threshold. However, there is a potential for increased cabin temperatures. The sunshade control system determines the high temperature area 314 by measuring internal and external temperature. Internal and/or external humidity may be measured. Prior to entering the high temperature area 314, the humidity and temperature may be obtained from an external source, such as the Internet.

In this example, if the driver enables the manual mode prior to, or while, the vehicle 304 navigates through the high temperature area 314, the sunshade control system prevents manual operation until the limited sunshades are deactivated. Furthermore, regardless of the operation mode, the sunshade control system may activate anytime sunshades prior to entering the high temperature area 314.

In yet another configuration, if the vehicle 304 parks in the high temperature area 314 (e.g., the gear is set to park) or has a velocity of zero in the high temperature area 314, the sunshade control system may autonomously activate the limited sunshades. Alternatively, the sunshade control system allows manual activation of the limited sunshades while the vehicle's velocity is zero and/or while the vehicle is in park. Additionally, during manual operation, the anytime sunshades may remain activated until the vehicle 304 leaves the high temperature area 314, after the interior temperature falls below a threshold, and/or an activation condition is no longer satisfied.

Figure 4:
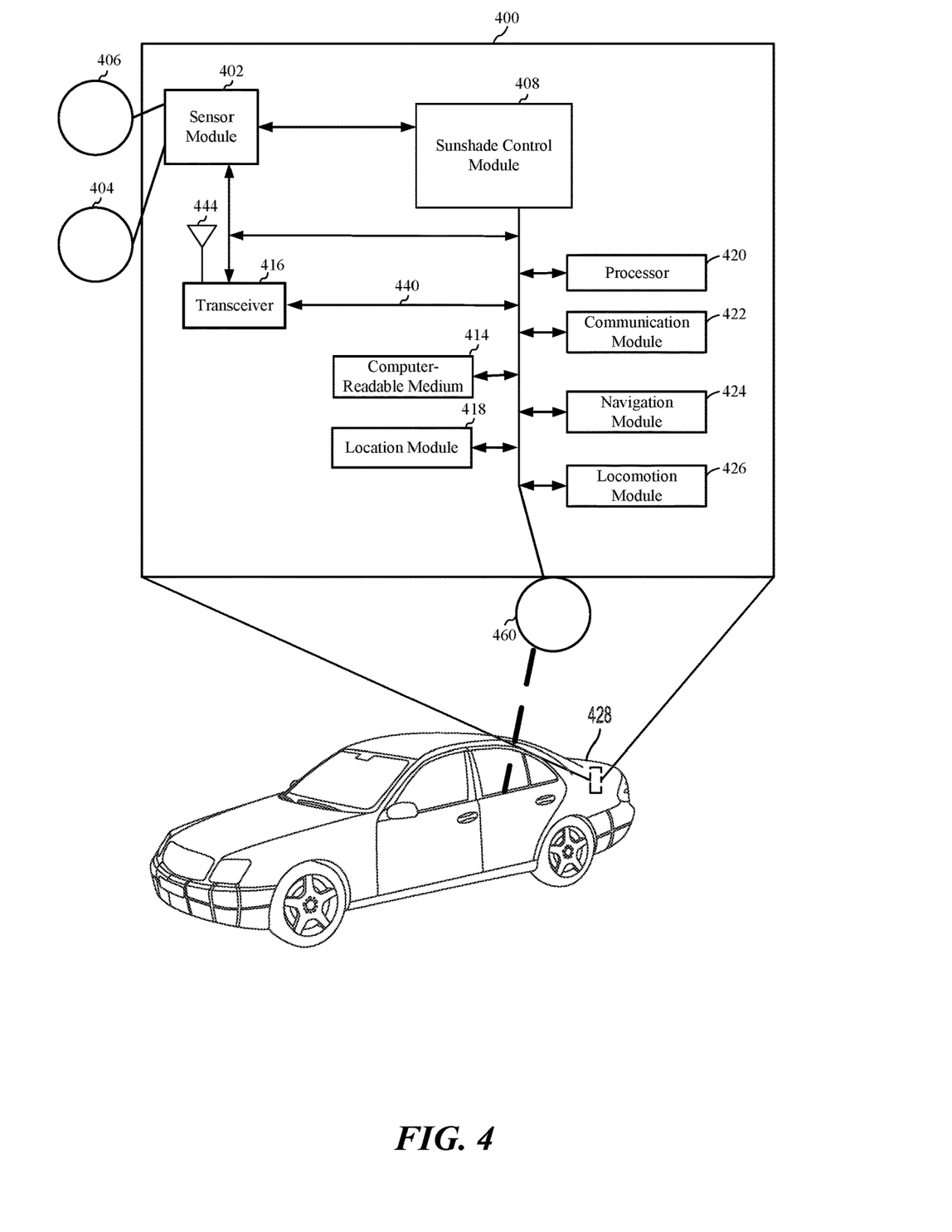
FIG. 4 is a diagram illustrating an example of a hardware implementation for a sunshade control system according to aspects of the present disclosure.

FIG. 4 is a diagram illustrating an example of a hardware implementation for a sunshade control system 400, according to aspects of the present disclosure. The sunshade control system 400 may be a component of a vehicle, a robotic device, or another device. For example, as shown in FIG. 4, the sunshade control system 400 is a component of a vehicle 428. The vehicle 428 may be an MAAS vehicle or a personal use vehicle. Aspects of the present disclosure are not limited to the sunshade control system 400 being a component of the vehicle 428, as other devices, such as a bus, boat, drone, or robot, are also contemplated for using the sunshade control system 400. The vehicle 428 may be autonomous or semi-autonomous. Furthermore, the vehicle 428 may be an electric vehicle, a hybrid vehicle, a fuel vehicle, or another type of vehicle.

The sunshade control system 400 may be implemented with a bus architecture, represented generally by a bus 440. The bus 440 may include any number of interconnecting buses and bridges depending on the specific application of the sunshade control system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The sunshade control system 400 includes a transceiver 416 coupled to the processor 420, the sensor module 402, a sunshade control module 408, the communication module 422, the location module 418, the locomotion module 426, the navigation module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the sunshade control module 408 to a server (not shown).

The sunshade control system 400 includes the processor 420 coupled to the computer-readable medium 414. The processor 420 performs processing, including the execution of software stored on the computer-readable medium 414 providing functionality according to the disclosure. The software, when executed by the processor 420, causes the sunshade control system 400 to perform the various functions described for a particular device, such as the vehicle 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be an internal vision sensor, such as a stereoscopic camera or a red-green-blue (RGB) camera, for capturing 2D images. The first sensor 406 may be used to determine environmental conditions (e.g., rain, sun, snow, etc.) or cabin conditions (e.g., levels of sunshine). The first sensor 406 may also be an internal climate sensor used for determining the internal temperature and/or humidity. The second sensor 404 may be an external climate sensor used for determining temperature, humidity, and/or other climate conditions. Of course, aspects of the present disclosure are not limited to the sensors discussed above as other types of sensors, such as, for example, LIDAR, RADAR, sonar, and/or lasers are also contemplated for either of the sensors 404, 406. Furthermore, additional internal and/or external sensors may be specified. For example, a water sensor may be defined on the windshield.

The measurements of the first sensor 406 and the second sensor 404 may be processed by one or more of the processor 420, the sensor module 402, the sunshade control module 408, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the sunshade control system 400.

The locomotion module 426 may be used to facilitate locomotion of the vehicle 428. As an example, the locomotion module 426 may control the movement of the wheels. As another example, the locomotion module 426 may be in communication with a power source of the vehicle 428, such as an engine or batteries. Of course, aspects of the present disclosure are not limited to providing locomotion via wheels and are contemplated for other types of components for providing locomotion, such as propellers, treads, fins, and/or jet engines.

The sunshade control system 400 also includes the navigation module 424 for planning a route or controlling the locomotion of the vehicle 428, via the locomotion module 426. A route may be planned to a passenger based on compartment data provided via the sunshade control module 408. In one configuration, the navigation module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The sunshade control module 408 may be in communication with the sensor module 402, the transceiver 416, the processor 420, the communication module 422, the location module 418, the locomotion module 426, the navigation module 424, and the computer-readable medium 414. In one configuration, the sunshade control module 408 receives sensor data from the sensor module 402. The sensor module 402 may receive the sensor data from the first sensor 406 and the second sensor 404. According to aspects of the present disclosure, the sensor module 402 may filter the data to remove noise, encode the data, decode the data, merge the data, extract frames, or perform other functions. In an alternate configuration, the sunshade control module 408 may receive sensor data directly from the first sensor 406 and the second sensor 404.

In one configuration, the sunshade control module 408 determines the current conditions based on information from the sensors 404, 406, the processor 420, the location module 418, the transceiver 416, the communication module 422, and/or the computer-readable medium 414. For example, the first sensor 406 may provide internal temperature and/or humidity. The second sensor 404 may provide external temperature and/or humidity. Additionally, the processor 420 and/or the computer-readable medium 414 may provide the status (e.g., activated or deactivated) of each sunshade as well as other information, such as battery or gas levels. The location module 418 may provide the vehicle's 428 current location to the sunshade control module 408. The transceiver 416 and/or the communication module 422 may be used to receive weather information from an external source, such as the Internet. The sunshade control module 408 may determine a duration of the current conditions based on information obtained from the external source.

If the current conditions satisfy an activation condition, the sunshade control module 408 may activate one or more anytime sunshades. Additionally, the sunshade control module 408 predicts a likelihood of the driver enabling a manual mode during the current conditions. The determination may be based on passenger information (e.g., driver information) obtained via the transceiver 416, the communication module 422, and/or the computer-readable medium 414. For example, the passenger information may be received from an external source when the passenger reserves the vehicle 428.

Additionally, the sunshade control module 408 may predict the likelihood of the driver enabling the manual mode based on a potential for stalling along a route. The stall factor(s) may be determined by information obtained from an external source, such as the Internet, the transceiver 416, sensor data obtained from the sensor module 402, and/or map and environment data stored in the computer-readable medium 414 and/or a memory (not shown). For example, the sunshade control module 408 may determine backlight conditions at intersections, the vehicle's 428 direction at intersections, the positions of traffic lights, the arrival time at intersections, the position of the sun, weather at the intersections, building information, as well as other factors.

If the driver is likely to enable the manual mode, the sunshade control module 408 deactivates any activated limited sunshades via the processor 420 and/or the computer-readable medium 414. Upon detecting that the conditions have been mitigated, the sunshade control module 408 may deactivate any activated sunshades via the processor 420 and/or the computer-readable medium 414. A sunshade controller 460 may be incorporated with each sunshade. The sunshade controller 460 may control motors, gears, gyros, and/or other mechanisms for activating or deactivating a sunshade. For example, an electric motor may control a rotatable shaft to feed out the sunshade, such that the sunshade expands across a window.

According to aspects of the present disclosure, the sunshade control module 408 may be configured for determining that current conditions satisfy an activation condition, predicting whether a driver will enable a manual mode during the current conditions, and activating a first sunshade in response to the satisfied activation condition.

Figure 5:
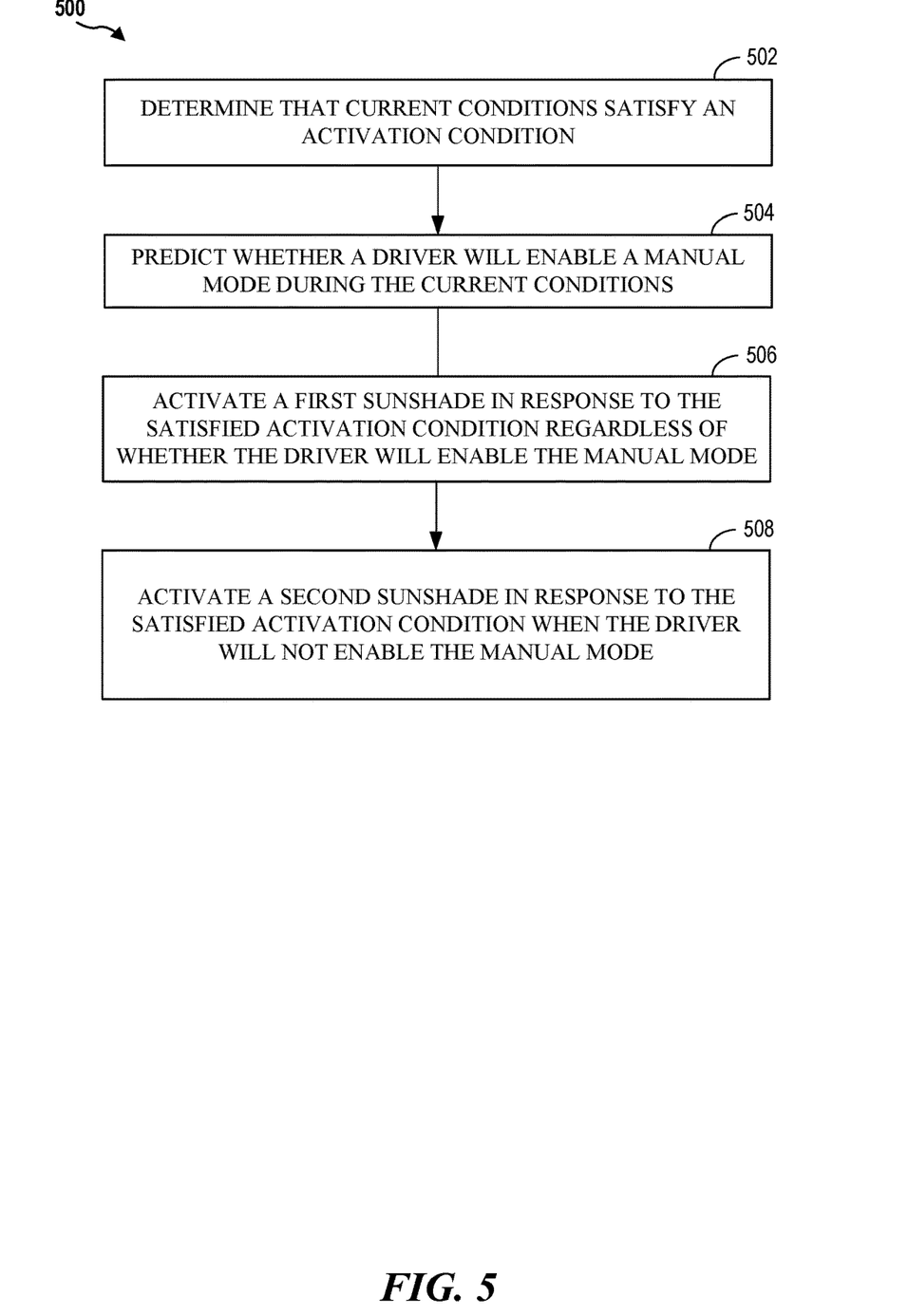
FIG. 5 illustrates a flow diagram for a method of controlling a sunshade according to aspects of the present disclosure.

FIG. 5 illustrates a method 500 for adjusting a seat in a vehicle, according to an aspect of the present disclosure. As shown in FIG. 5, at block 502, sunshade control system determines that current conditions satisfy an activation condition. The current conditions may be determined based on internal climate sensor, an external climate sensor, weather data, an internal vision sensor, an external vision sensor, a planned route, a current trajectory, and/or other information. For example, if the current trajectory is towards the sun, the current condition may satisfy an activation condition.

At block 504, the sunshade control system predicts whether a driver will enable a manual mode during the current conditions. The prediction is based on a potential for stalling on a current route, a proximity of the autonomous vehicle to a destination of the driver, a reservation status, driver information, and/or other information. The manual mode refers to a mode where the driver (e.g., human) manually operates the vehicle.

At block 506, the sunshade control system activates a first sunshade in response to the satisfied activation condition regardless of whether the driver will enable the manual mode. The first sunshade may be referred to as an anytime sunshade. The first sunshade reduces an amount of light entering a cabin and/or an amount of light exiting the cabin via the rear passenger window.

For example, a passenger may prefer an illuminated cabin. In one example, the cabin may be illuminated to add additional light for a working environment. The first and/or second sunshades may prevent the cabin light from leaving the vehicle. In one configuration, when the cabin luminance is greater than a threshold and the outside luminance is less than a threshold, the first and second sunshades may be activated. Specifically, if the sunshade control system determines that the manual operation is not likely and the sunshade control system detect that the internal brightness is greater than a threshold and the external brightness is less than another threshold, the first and second sunshades may be activated to prevent the cabin light from leaking out.

At block 508, the sunshade control system activates a second sunshade in response to the satisfied activation condition when the driver will not enable the manual mode. The second sunshade may be referred to as a limited sunshade. The second sunshade reduces an amount of light entering a cabin, and/or an amount of light exiting the cabin via a front windshield, a front driver side window, or a front passenger side window. In one configuration, the sunshade control system deactivates the second sunshade, when the second sunshade has been previously activated, in response predicting that the driver will enable the manual mode.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling one or more sunshades of a vehicle, comprising:
    determining a current environmental condition satisfies an activation condition during an autonomous vehicle operating mode;
    predicting an operating mode of the vehicle during the current environmental condition;
    activating a first sunshade based on the current environmental condition satisfying the activation condition; and
    activating a second sunshade based on the current environmental condition satisfying the activation condition and based on the predicted operating mode, activation of the second sunshade limited to the predicted operating mode being an autonomous vehicle operating mode, and a location of the first sunshade being different from a location of the second sunshade.

2. The method of claim 1, wherein predicting the operating mode of the vehicle comprises predicting a driver will enable a manual vehicle operating mode during the current environmental condition based on at least one of a potential for stalling on a current route, a proximity of the vehicle to a destination of the driver, a reservation status, driver information, or a combination thereof.

3. The method of claim 1, further comprising determining the current environmental condition based on at least one of an internal climate sensor, an external climate sensor, weather data, an internal vision sensor, an external vision sensor, a planned route, a current trajectory, or a combination thereof.

4. The method of claim 1, in which the first sunshade reduces at least one of an amount of light entering a cabin, an amount of light exiting the cabin, or a combination thereof, via a rear passenger window.

5. The method of claim 1, in which the second sunshade reduces an amount of light entering a cabin, an amount of light exiting the cabin, or a combination thereof, via a front windshield, a front driver side window, or a front passenger side window.

6. The method of claim 1, further comprising deactivating the second sunshade based on determining second sunshade is currently activated and based on the predicted operating mode being the manual vehicle operating mode.

7. An apparatus for controlling one or more sunshades of a vehicle, the apparatus comprising:
    a memory; and
    at least one processor coupled to the memory, the at least one processor configured:
        to determine a current environmental condition satisfies an activation condition during an autonomous vehicle operating mode;
        to predict an operating mode of the vehicle during the current environmental condition;
        to activate a first sunshade based on the current environmental condition satisfying the activation condition; and
        to activate a second sunshade based on the current environmental condition satisfying the activation condition and based on the predicted operating mode, activation of the second sunshade limited to the predicted operating mode being an autonomous vehicle operating mode, and a location of the first sunshade being different from a location of the second sunshade.

8. The apparatus of claim 7, in which the at least one processor is further configured to predict a driver will enable a manual vehicle operating mode during the current environmental condition based on at least one of a potential for stalling on a current route, a proximity of the vehicle to a destination of the driver, a reservation status, driver information, or a combination thereof.

9. The apparatus of claim 7, in which the at least one processor is further configured to determine the current environmental condition based on at least one of an internal climate sensor, an external climate sensor, weather data, an internal vision sensor, an external vision sensor, a planned route, a current trajectory, or a combination thereof.

10. The apparatus of claim 7, in which the first sunshade reduces at least one of an amount of light entering a cabin, an amount of light exiting the cabin, or a combination thereof, via a rear passenger window.

11. The apparatus of claim 7, in which the second sunshade reduces an amount of light entering a cabin, an amount of light exiting the cabin, or a combination thereof, via a front windshield, a front driver side window, or a front passenger side window.

12. The apparatus of claim 7, in which the at least one processor is further configured to deactivate the second sunshade based on determining the second sunshade is currently activated and based on the predicted operating mode being the manual vehicle operating mode.

13. A non-transitory computer-readable medium having program code recorded thereon for controlling one or more sunshades of a vehicle, the program code executed by a processor and comprising:
- program code to determine a current environmental condition satisfies an activation condition during an autonomous vehicle operating mode;
- program code to predict an operating mode of the vehicle during the current environmental condition;
- program code to activate a first sunshade based on the current environmental condition satisfying the activation condition; and
- program code to activate a second sunshade based on the current environmental condition satisfying the activation condition and based on the predicted operating mode, activation of the second sunshade limited to the predicted operating mode being an autonomous vehicle operating mode, and a location of the first sunshade being different from a location of the second sunshade.

14. The non-transitory computer-readable medium of claim 13, in which the program code to predict the operating mode further comprises program code to predict a driver will enable a manual vehicle operating mode during the current environmental condition based on at least one of a potential for stalling on a current route, a proximity of the vehicle to a destination of the driver, a reservation status, driver information, or a combination thereof.

15. The non-transitory computer-readable medium of claim 13, in which the program code further comprises program code to determine the current environmental condition based on at least one of an internal climate sensor, an external climate sensor, weather data, an internal vision sensor, an external vision sensor, a planned route, a current trajectory, or a combination thereof.

16. The non-transitory computer-readable medium of claim 13, in which the first sunshade reduces at least one of an amount of light entering a cabin, an amount of light exiting the cabin, or a combination thereof, via a rear passenger window.

17. The non-transitory computer-readable medium of claim 13, in which the second sunshade reduces an amount of light entering a cabin, an amount of light exiting the cabin, or a combination thereof, via a front windshield, a front driver side window, or a front passenger side window.

18. The non-transitory computer-readable medium of claim 13, in which the program code further comprises program code to deactivate the second sunshade based on determining the second sunshade is currently activated and based on the predicted operating mode being the manual vehicle operating mode.

* * * * *